United States Patent [19]
Kmiec et al.

[11] Patent Number: 5,639,120
[45] Date of Patent: Jun. 17, 1997

[54] SEAT BELT BUCKLE PRETENSIONER WITH END CAP

[75] Inventors: Timothy M. Kmiec, Rochester Hills; Michael J. Andrus, Farmington Hills; William C. Shelton, Sterling Heights, all of Mich.

[73] Assignee: Ford Motor Company, Dearborn, Mich.

[21] Appl. No.: 534,679

[22] Filed: Sep. 27, 1995

[51] Int. Cl.$^6$ .................. B60R 22/36; B60R 22/46
[52] U.S. Cl. ............................ 280/806; 280/805
[58] Field of Search .......................... 280/805, 806

[56] References Cited

U.S. PATENT DOCUMENTS

| | | | |
|---|---|---|---|
| 4,573,322 | 3/1986 | Föhl | 280/806 |
| 4,917,210 | 4/1990 | Danicek et al. | 280/806 |
| 5,118,135 | 6/1992 | Yano | 280/806 |
| 5,207,618 | 5/1993 | Nishizawa | 280/806 |
| 5,350,194 | 9/1994 | Föhl | 280/805 |
| 5,366,245 | 11/1994 | Cane | 280/806 |
| 5,403,037 | 4/1995 | Föhl | 280/806 |

*Primary Examiner*—Kenneth R. Rice
*Attorney, Agent, or Firm*—Daniel M. Stock

[57] ABSTRACT

An automotive seat belt pretensioner assembly is provided which includes a housing assembly (12) for receiving a cable (18) that is driven by a piston (16) toward an open end (54) of an actuator housing (24) in response to the operation of a pyrotechnic gas generating device (20). A plastic end cap (26) is provided for covering the housing end (54). The cap (26) includes a frangible end wall (54) for permitting passage of an end (46) of the cable (18). The frangible end wall (54) includes a pattern of reduced wall thickness (56).

8 Claims, 2 Drawing Sheets

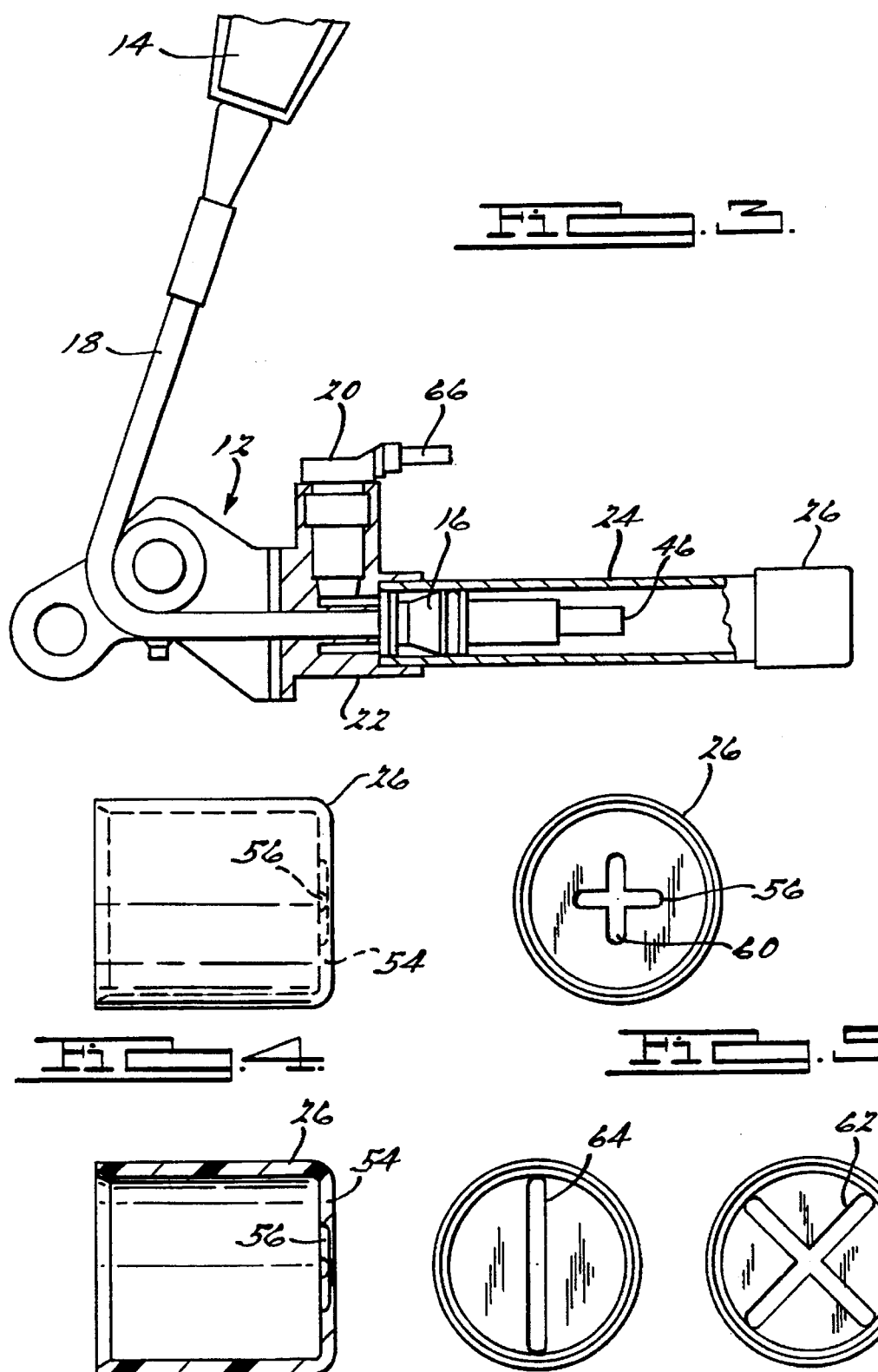

5,639,120

SEAT BELT BUCKLE PRETENSIONER WITH END CAP

BACKGROUND OF THE INVENTION

1. Field of the Invention

The present invention relates generally to automotive occupant restraint systems, and more specifically to the construction of mechanisms for providing condition responsive pretensioning force to the buckle end of the automotive seat belt systems.

2. Description of Related Art

It is well-known in the automotive industry to provide pretensioning devices for enhancing the efficacy of occupant restraint systems that employ seat belts. In one particular type of pretensioning device, a pyrotechnic gas generator is employed to drive the end of a cable supporting a seat belt buckle in response to a predetermined deceleration of the vehicle in which the buckle is installed. U.S. Pat. No. 5,403,037 is exemplary of such pretensioning devices. One important design constraint in providing such a pretensioner is to provide a housing for accommodating the travel of the mechanism that is displaced by the gases in the pyrotechnic device. This space for travel must be provided in the design of this automotive component with regard to the overall desire of designers and manufacturers of automobiles to minimize the weight and cost of the components used in the assembly of the vehicle. Since the movement that must be accommodated is not normal and repetitive movement in the use of occupant restraint systems, but rather is emergency condition responsive, it is particularly true that the weight and cost of the component incurred through the provision of such space be of particular importance. It has been found that the cost and weight of such a pretensioning device may be improved through the design of a housing that permits movement of a portion of the pretensioning structure including a structure attaching it to the seat belt system outside of the housing of the pretensioner itself.

It is also a design constraint in such designs to economically and effectively seal the movable components of the pretensioner from the surrounding vehicle environment.

SUMMARY OF THE INVENTION

The occupant restraint system pretensionor design constraints are met, and disadvantages of prior art devices are overcome in the invention sealtbelt buckle pretensioner which provides a base housing securable to an automotive vehicle body, an actuator housing received in the base housing and having an elongated bore opening at a free end. A cable interconnecting a seat belt buckle and a piston member is received in the elongated bore and a collar fixes the cable and the piston in axially fast relationship. A pyrotechnic gas generator connected to the piston and selectively operable to move the piston toward the housing free end to pretension the seat belt buckle and an end cap secured over the housing free end and closing it.

According to one feature of the invention, the end cap is a cup-shaped member fixedly secured over the end of the housing.

According to another feature of the invention, the end cap includes a frangible end wall permitting passage of the cable and the swage collar when the piston is driven toward the housing free end.

BRIEF DESCRIPTION OF THE DRAWINGS

These and other features and advantages of the present invention will occur to those skilled in the automotive occupant restraint arts upon reading the following description with reference to the accompanying drawings, in which:

FIG. 3 is a view similar to FIG. 2, illustrating the assembled inoperative position of the invention automotive seat belt buckle pretensioner assembly.

FIG. 4 is a side view of one embodiment of an end cap of the invention pretensioner assembly.

FIG. 5 is an end view of the cap of FIG. 4.

FIG. 6 is a cross-sectional view of FIG. 4.

FIG. 7 is an end view of an alternative embodiment of the cap of FIG. 4.

FIG. 8 is an end view of yet another alternative embodiment of the cap of FIG. 4.

DESCRIPTION OF THE PREFERRED EMBODIMENTS

Figure 1:
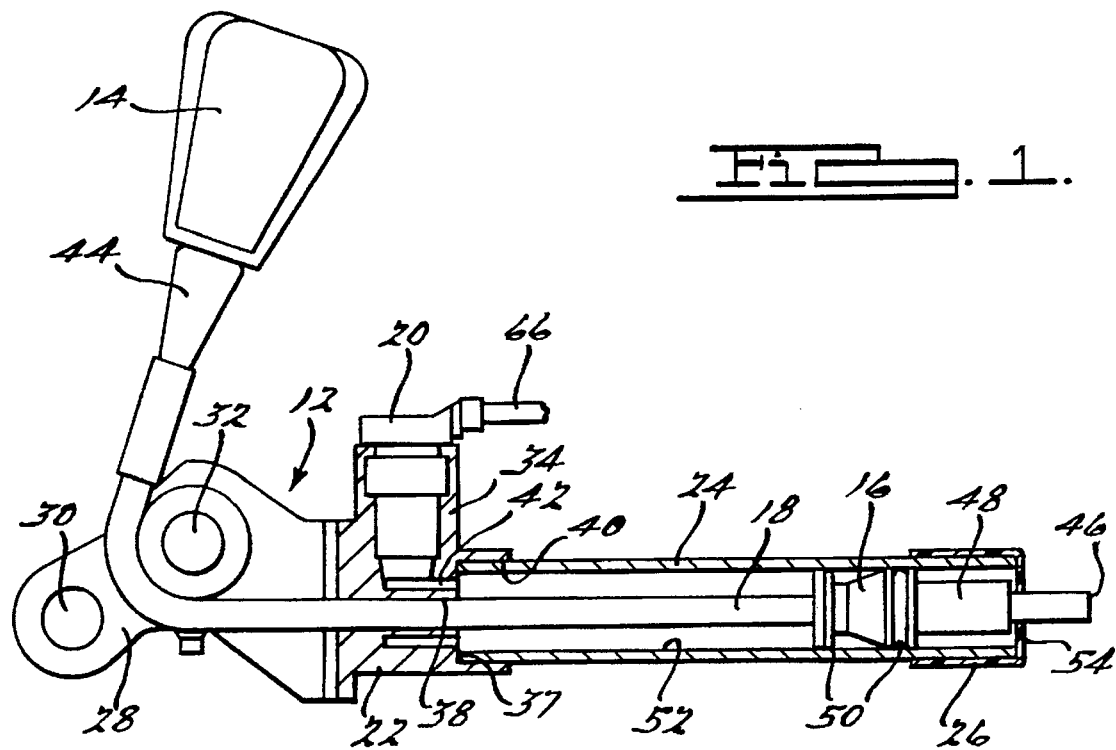
FIG. 1 is a diagrammatic cross-sectional view of the automotive seat belt buckle pretensioner assembly of the present invention illustrated in its operative position in which a seat belt buckle is pretensioned.
Figure 2:
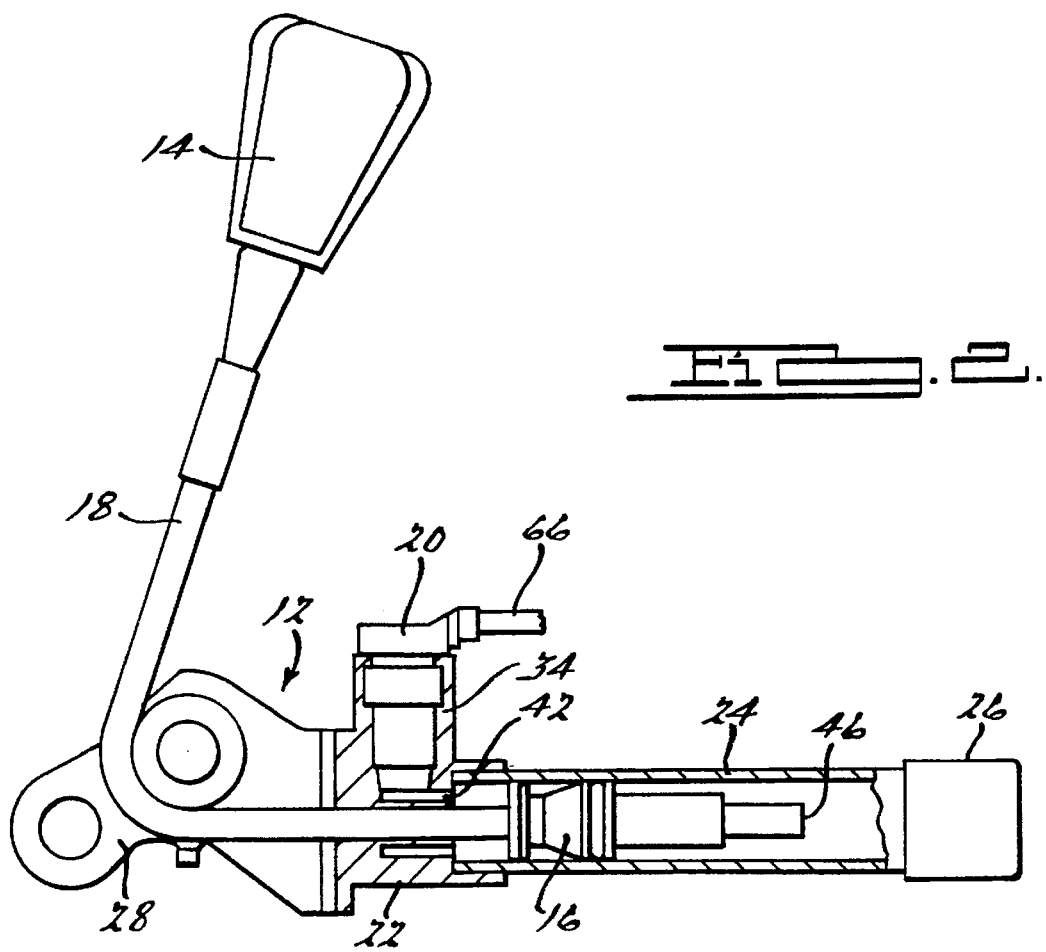
FIG. 2 is a view similar to FIG. 1, shown in an intermediate operative position.

Turning now to the drawings, and in particular to FIGS. 1–3 thereof, an automotive seat belt buckle pretensioner assembly 10 is illustrated as comprising generally a housing assembly 12 that is adapted to be secured to internal surfaces of a passenger compartment of an automotive vehicle (not shown), a seat belt buckle 14, a piston 16, a cable 18 interconnecting the buckle 14 and the piston 16, and a pyrotechnic gas generating device 20.

The housing assembly 12 is illustrated as comprising a base housing 22, an elongated actuator housing 24, and an end cap 26. The base housing 22 includes a mounting portion 28 illustrated as having a pair of apertures 30, 32 formed through it for receiving suitable fasteners for fixing the automotive seat belt buckle pretensioner assembly 10 to a portion of the automotive vehicle. The base housing 22 further includes a manifold portion 34 for operatively mounting the pyrotechnic gas generating device 20 and the cable. 18. To that end, the manifold portion 34 includes a stepped bore 36 for receiving the automotive seat belt, buckle pretensioner assembly 10 and includes a through-bore 38 allowing passage of the cable 18. A recess 40 is formed extending inwardly from one end of the manifold portion 34 for receiving the actuator housing 24, and an annular gas communicating passage 42 is formed to communicate with the recess 40 and the inner end 37 of the stepped bore 36.

The seat belt buckle 14 may be of any suitable design and is fixedly secured to one end 44 of the cable 18, which is preferably of known construction. The cable 18 passes through the bore 38 and terminates in its other end 46 having passed through a similar bore (not shown) in the piston 16. The piston 16 includes a swage collar portion 48, or similar device formed integral therewith or separately, for making the piston 16 axially fast on the cable 18 through mechanism deformation. The piston 16 may be chosen from many suitable designs, but necessarily defines an outer cylindrical surface as indicated at 50 for freely slidable engagement within actuator housing 24.

The actuator housing 24 is preferably formed as an elongated tubular member that is fixedly secured within the recess 40 of the base housing 22 and having an internal through-bore 52 having an axis registering with the axis of the bore 38 in the base housing 22.

The elongated housing 24 includes a free end 54 that is closed from the atmosphere by the end cap 26 in assembled and operative positions of the assembly 10, as shown in FIGS. 2 and 3.

The actuator housing 24 is preferably fabricated as a metallic component. End cap 26 is preferably formed as a cup-like plastic member. It is fixedly secured over the free end 54 of the actuator housing 24 and secured in axially fast relationship. This may be accomplished through shrink-fitting the end cap 26 over the actuator housing 24 or by securing the cap 26 to the housing 24 through suitable adhesive. Other fixing mechanisms are also suitable.

The end cap 26 preferably includes a frangible end wall 56, as may best be seen FIGS. 4–8. The frangible end wall may be formed by defining a pattern of reduced wall thickness in the end wall, as indicated at 58. FIGS. 5–8 illustrate desired patterns for the area of reduced wall thickness 58. FIGS. 5 and 8 show the cross-patterns 60, 62 and FIG. 7 shows an elongated slot 64.

Operation of the Preferred Embodiment

When installed in an automotive vehicle body, the seat belt buckle pretensioner assembly of the present invention assumes the position shown in FIG. 3. When so assembled, the end cap 26 provides a barrier to contaminants entering within the bore 52 of the actuator housing 24, reducing the risk of interference with operation.

As is well-known, modern automotive vehicles employing passive occupant restraint systems employ acceleration sensors transmitting electrical signals in response to the occurrence of deceleration events above a predetermined threshold. Such an electrical signal is selectively transmittable through an electrical conductor, such as indicated diagrammatically at 66, to the pyrotechnic gas generating device 20, the design of which is not, itself important to an understanding of the present invention. It is well-known in the automotive occupant restraints art that such gas generators, upon receiving a proper signal through a conductor 66, may be operated to generate gas that in the pretensioner assembly 10 of the present invention flow through passage. 42 to displace the piston 16 rightwardly, as illustrated in FIGS. 1–3. Movement of tile Piston 16 draws the cable 18 through the bore 38 and urges the cable end 46 toward the free end 54 of the actuator assembly 24. This motion draws the buckle 14 downwardly, pretensioning any seat belt component to which it is connected in a known manner. The fully extended position shown in FIG. 1 is reached when the cable end 46 pierces the frangible wall 56 of the end cap 26 to reduce thickness sections 58 and enhance the frangible nature of the end wall 56 and accordingly do not interfere with the pretensioning movement of the piston 16.

While only certain embodiments of tile present invention have been described, those skilled in the automotive restraints arts will appreciate that others may be possible without departure from the scope of the following claims.

What is claimed is:

1. An automotive seat belt buckle pretensioner assembly comprising:

a base housing adapted to be secured to an automotive vehicle body and having a first bore formed therethrough;

an elongated actuator housing having a first end fixedly secured to said base housing and a second free end and having a second bore formed therethrough from said first end to said second end in registration with said base housing first bore;

a seat belt buckle;

a cable having its one end fixedly secured to said buckle and its other end received through said first bore and into said actuator housing;

a piston member receiving said cable second end axially therethrough and being slidably received in said second bore, said cable second end extending axially beyond said piston member toward said actuator housing second end;

a swage collar fixedly secured proximate said cable second end to hold said piston member axially fast to said cable;

a pyrotechnic gas generator operatively connected to said piston member to selectively drive said piston member toward said actuator housing second end; and a cup-shaped end cap receiving said actuator housing second end, fixedly secured to said actuator housing and having a frangible end wall substantially closing said actuator housing second end operative to permit passage of said cable second end and said swage collar when said piston is driven toward said actuator housing second end.

2. An automotive seat belt buckle pretensioner assembly as defined in claim 1, wherein said end cap is substantially imperforate.

3. An automotive seat belt buckle pretensioner assembly as defined in claim 1, wherein said end cap is formed of plastic.

4. An automotive seat bait buckle pretensioner assembly comprising:

a base housing adapted to be secured to an automotive vehicle body and having a first bore formed therethrough;

an elongated actuator housing having a first end fixedly secured to said base housing and a second free end and having a second bore formed therethrough from said first end to said second end in registration with said base housing first bore;

a seat belt buckle;

a cable having its one end fixedly secured to said buckle and its other end received through said first bore and into said actuator housing;

a piston member receiving said cable second end axially therethrough and being slidably received in said second bore, said cable second end extending axially beyond said piston member toward said actuator housing second end;

a swage collar fixedly secured proximate said cable second end to hold said piston member axially fast to said cable;

a pyrotechnic gas generator operatively connected to said piston member to selectively drive said piston member toward said actuator housing second end; and a plastic end cap fixedly secured in shrink-fit relationship over said actuator housing and arranged to close said actuator housing second end.

5. An automotive seat, belt buckle pretensioner assembly as defined in claim 4, wherein said end cap includes a frangible end wall for permitting passage of said cable second end and said swage collar when said piston is driven toward said actuator housing second end.

6. An automotive seat belt buckle pretensioner assembly as defined in claim 5, wherein said end cap is formed of plastic and said frangible end wall comprises a pattern of reduced wall thickness formed in said end wall.

7. An automotive seat belt buckle pretensioner assembly as defined in claim 6, wherein said pattern comprises a diametrically extending blind slot.

8. An automotive seat belt buckle pretensioner assembly as defined in claim 6, wherein said pattern comprises two mutually perpendicular blind slots.

* * * * *